United States Patent
Prost et al.

(10) Patent No.: US 10,532,299 B2
(45) Date of Patent: Jan. 14, 2020

(54) SELF-CLEANING FILTER

(71) Applicant: Schlumberger Technology Corporation, Sugar Land, TX (US)

(72) Inventors: Jerome Prost, Houston, TX (US); Hy Phan, Houston, TX (US); Stephen Thompson, Aberdeen (GB); Soufiane Halily, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 35 days.

(21) Appl. No.: 15/208,742

(22) Filed: Jul. 13, 2016

(65) Prior Publication Data

US 2018/0015395 A1   Jan. 18, 2018

(51) Int. Cl.
*B01D 29/64* (2006.01)
*E21B 37/08* (2006.01)
*B01D 29/35* (2006.01)

(52) U.S. Cl.
CPC ......... *B01D 29/6484* (2013.01); *B01D 29/35* (2013.01)

(58) Field of Classification Search
CPC ............................ B01D 29/6484; B01D 29/35
USPC ........................................................ 166/170
See application file for complete search history.

(56) References Cited

U.S. PATENT DOCUMENTS

| | | | |
|---|---|---|---|
| 4,043,918 A | 8/1977 | Orona | |
| 4,156,651 A | 5/1979 | Mehoudar | |
| 4,266,606 A * | 5/1981 | Stone | E21B 47/18 |
| | | | 137/624.13 |
| 5,164,079 A * | 11/1992 | Klein | B01D 29/117 |
| | | | 210/186 |
| 7,192,528 B2 | 3/2007 | Prochaska et al. | |
| 2002/0040868 A1* | 4/2002 | Lockwood | B01D 29/114 |
| | | | 210/106 |
| 2007/0114190 A1* | 5/2007 | Laing | B01D 33/073 |
| | | | 210/791 |
| 2008/0017568 A1* | 1/2008 | Robert | B04C 5/13 |
| | | | 210/413 |

* cited by examiner

*Primary Examiner* — Taras P Bemko

(57) ABSTRACT

A self-cleaning filter includes a housing disposing a filter media having a permeable sidewall and an axial bore connected with the inlet conduit, a sleeve connected in-line with the axial bore and downstream of the inlet conduit, and a shuttle having a piston moveably disposed in the sleeve and an upstream element carrying a scraper disposed with the axial bore, whereby the hydraulic fluid flows from the inlet conduit through the permeable sidewall into the housing annulus and the hydraulic pressure in the axial bore applies a downward force on the shuttle. The scraper is moved downstream within axial bore to clean the filter media when the downward force due to the increased differential pressure across the filter media exceeds an upstream shuttle force.

17 Claims, 3 Drawing Sheets

FIG. 2
FIG. 3
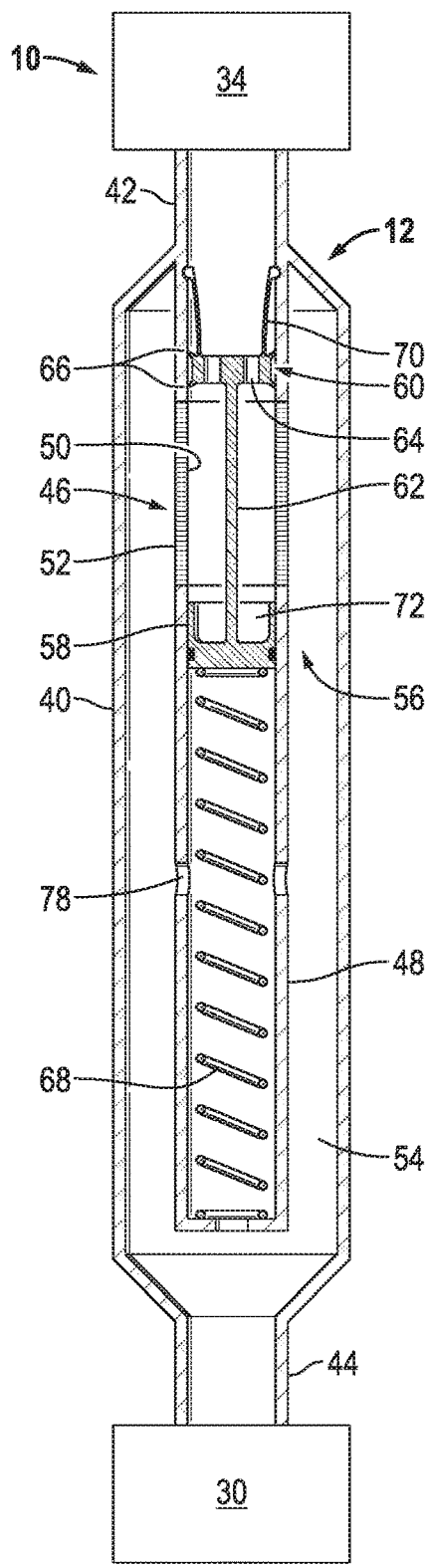
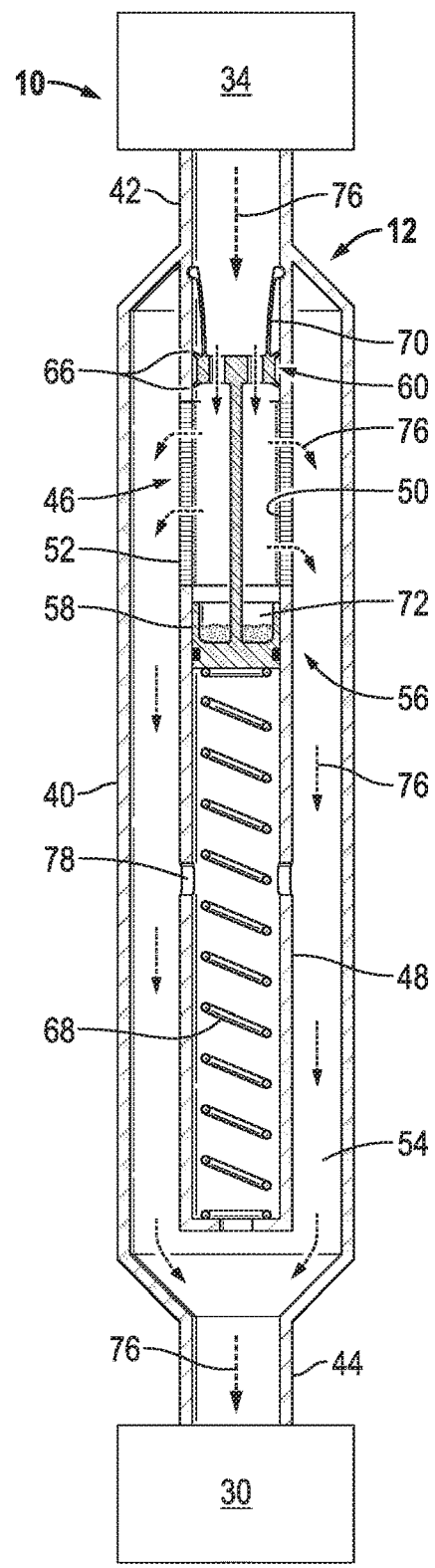

SELF-CLEANING FILTER

BACKGROUND

This section provides background information to facilitate a better understanding of the various aspects of the disclosure. It should be understood that the statements in this section of this document are to be read in this light, and not as admissions of prior art.

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. One piece of equipment which may be installed is a hydraulic control system suitable to control various downhole deployed components. A hydraulic control system's reliability may be affected by any contamination found inside the hydraulic fluid.

SUMMARY

In accordance to aspects of the disclosure a filter for a hydraulic circuit includes a housing to permit flow of hydraulic fluid from an inlet conduit to an outlet, a filter media having a permeable sidewall and an axial bore connected with the inlet conduit, a sleeve connected in-line with the axial bore and downstream of the inlet conduit, an annulus between the housing and the permeable sidewall in communication with the outlet and a shuttle having a piston moveably disposed in the sleeve and an upstream element carrying a scraper to remove debris from the permeable sidewall when the scraper is moved in the axial bore. The hydraulic fluid flows from inlet conduit, the axial bore and through the permeable sidewall to the annulus and outlet. Hydraulic pressure in the axial bore biases or urges the shuttle downstream.

An example of a method includes filtering hydraulic fluid flowing through a filter, the filter including a housing permitting the hydraulic fluid to flow from an inlet conduit and to an outlet, a filter media having a permeable sidewall and an axial bore connected with the inlet conduit, a sleeve connected in-line with the axial bore and downstream of the inlet conduit, an annulus between the housing and the permeable sidewall in communication with the outlet, and a shuttle having a piston moveably disposed in the sleeve and an upstream element carrying a scraper disposed with the axial bore, whereby the hydraulic fluid flows from the inlet conduit through the permeable sidewall into the annulus, applying a downstream force to the shuttle in response to hydraulic pressure in the axial bore and biasing the shuttle upstream with an upstream shuttle force in response to a biasing device. The method may include scraping the permeable sidewall as the shuttle moves downstream in response to the downstream force exceeding the upstream shuttle force and scraping the permeable sidewall as the shuttle moves upstream in response to the upstream shuttle force exceeding the downstream force.

A well system according to aspects of the disclosure includes a hydraulic device connected in a hydraulic circuit and disposed in a wellbore, the hydraulic device actuated in response to hydraulic signals and a filter connected in the hydraulic circuit, the filter including a housing permitting the hydraulic fluid to flow from an inlet conduit and to an outlet, a filter media having an axial bore connected with the inlet conduit and a permeable sidewall, a sleeve connected in-line with the axial bore and downstream of the inlet conduit, an annulus between the housing and the permeable sidewall and in communication with the outlet, a shuttle having a piston moveably disposed in the sleeve and an upstream element carrying a scraper positioned to remove debris from the permeable sidewall when the scrapper is moved in the axial bore and a bias device located in the sleeve and applying an upstream force on the shuttle.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 2 is a schematic illustration of a hydraulic circuit incorporating a self-cleaning filter according to one or more aspects of the disclosure.

FIG. 3 is a schematic illustration of a hydraulic circuit incorporating a self-cleaning filter in a first position according to one or more aspects of the disclosure.

DETAILED DESCRIPTION

Figure 1:
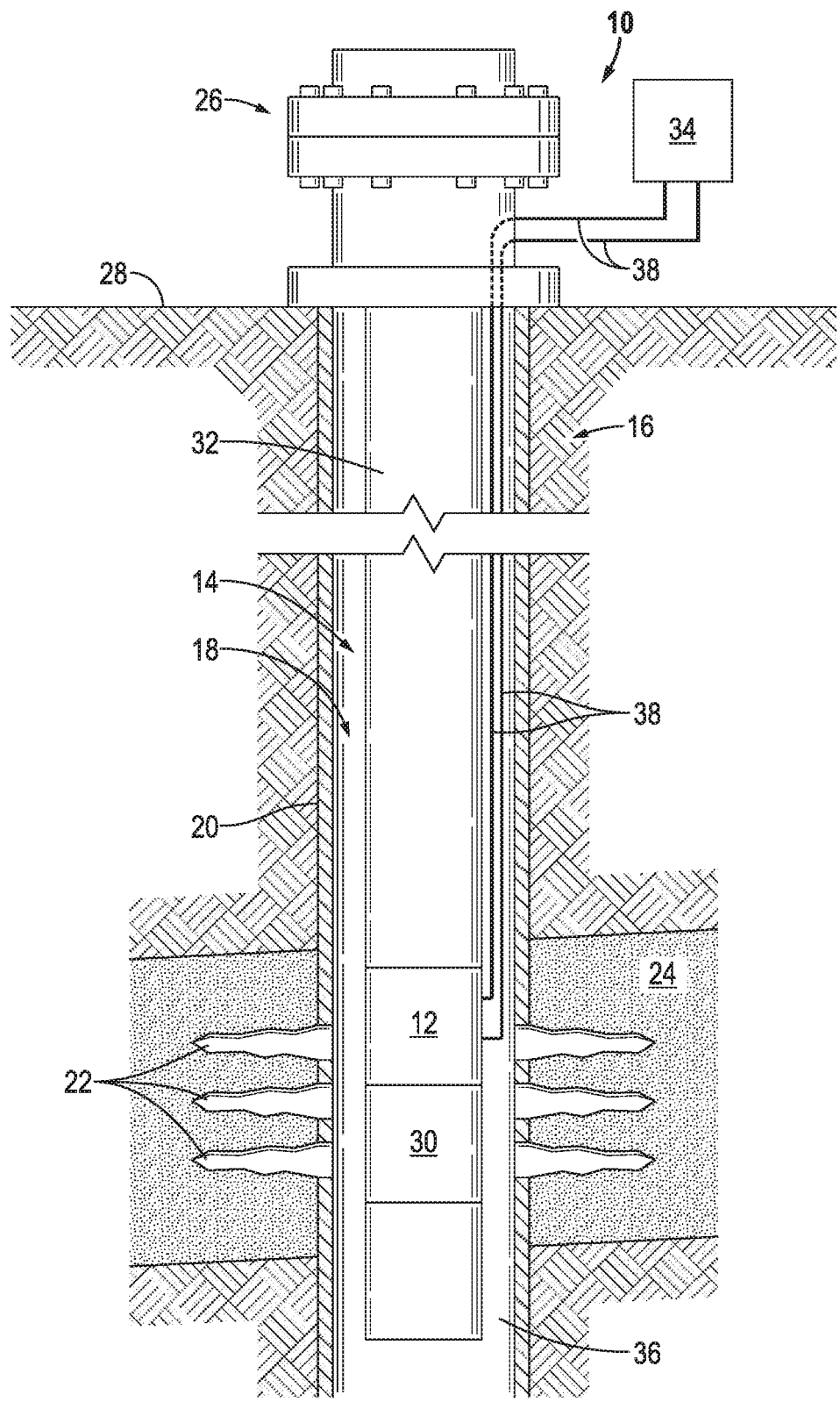
FIG. 1 is a schematic view of an apparatus according to one or more aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms connect, connection, connected, in connection with, and connecting may be used to mean in direct connection with or in connection with via one or more elements. Similarly, the terms couple, coupling, coupled, coupled together, and coupled with may be used to mean directly coupled together or coupled together via one or more elements. Terms such as up, down, top and bottom and other like terms indicating relative positions to a given point or element may be utilized to more clearly describe some elements. Commonly, these terms relate to a reference point such as the surface from which drilling operations are initiated.

FIG. 1 illustrates a well system 5 incorporating a hydraulic circuit 10 in which a filter 12 and filtering methods according to aspects of the disclosure may be employed. The illustrated well system 5 comprises a well completion 14 deployed for use in a well 16 having a wellbore 18. Wellbore 18 may be lined with casing 20 for example having openings 22 (e.g., perforations, slotted liner, screens) through which fluid is able to flow between the surrounding formation 24 and wellbore 18. Completion 14 is deployed in wellbore 18 below a wellhead 26 disposed at a surface 28 (e.g., terrestrial surface, seabed).

Completion 14 and hydraulic circuit 10 includes a hydraulically operated device 30 deployed in wellbore 18 for example by a conveyance 32 (e.g., tubular string) depicted and described in some embodiments as tubing 32. The hydraulic device 30 is not limited to use downhole, but may also be located for example in wellhead equipment and in drilling systems. Hydraulic device 30 may be a device having two or more operating positions, for example, open and closed positions for controlling fluid flow, partially opened (e.g., choked) fluid control positions, and on and off positions. Examples of downhole tool 30 include without limitation, valves such as formation isolation valves ("Hy"), inflow-outflow control devices ("ICD"), flow control valves ("FCV"), chokes and the like, as well other downhole devices such as rotary valves, actuators, packers and tubing hangers.

Hydraulic device 30 is actuated in response to hydraulic pressure signals which may be applied for example by a hydraulic fluid source 34 (e.g., hydraulic fluid and pump) which may be located for example at or above surface 28, for example on a marine platform or drilling vessel. Hydraulic pressure may be applied to hydraulic device 30 for example through tubing 32, the wellbore annulus 36, and/or one or more control lines 38.

The self-cleaning filter 12 and methods of filtering disclosed herein are not limited to well systems and may be utilized in any hydraulic circuit (i.e., in-line with a hydraulically actuated device).

Examples of the self-cleaning valve 12 and methods of filtering are described with reference to FIGS. 1-5. The filter 12 includes a housing 40 having an inlet conduit 42 and an outlet 44, a filter media 46 connected to the inlet conduit 42 and an internal sleeve 48 mounted downstream and in-line with the filter media 46. The filter media 46 includes an axial bore 50 and a permeable sidewall 52 (e.g., porous media, mesh, screen). The internal sleeve 48 is mounted in-line with the axial bore 50. The annulus 54 between the housing 40 and the filter media 46 and the internal sleeve 48 is in communication with the outlet 44. A shuttle 56 is moveably positioned in the axial bore 50 and the internal sleeve 48. The shuttle 56 has a downstream piston 58 located in the sleeve 48 and spaced apart from an upstream element 60 for example a distance substantially the same as or greater than the length of the filter sidewall. The piston 58 provides a fluid seal in the sleeve 48. The piston 58 and upstream element 60 are shown interconnected and spaced apart by a rod 62. Disposed with the upstream element 60 are at least one axial port 64 and one or more circumferential scrapers 66. A biasing device 68 (e.g., mechanical or fluidic spring) is located in the internal sleeve 48 downstream of the piston 58 of the shuttle 56 to bias the shuttle 56 upstream toward a first position with the upstream element 60 and scraper 66 located upstream of the filter sidewall 52.

In some embodiments a releasable latch 70 (e.g., collet) is connectable between the shuttle 56, e.g., element 66, and the inlet conduit 42 or other element to selectively maintain the shuttle 56 in the first position until a force is applied greater than the set-force of the latch 70. The shuttle 56 may also include a receptacle 72 located upstream of the piston 58 to capture debris 74 removed from the filter media 46.

The hydraulic pressure in the axial bore acts on the shuttle in the downstream direction and the hydraulic pressure in the annulus and outlet side act on the shuttle in the opposite direction upstream direction. Provided the surfaces areas are the same the difference in the downstream force and the upstream force is due to the pressure loss across the permeable sidewall. The bias device 68 provides an upward force to counter the net hydraulic downward force on the shuttle due to the pressure loss across the filter media when clean plus an additional pressure loss to account for an acceptable amount of clogging of the filter media. The self-cleaning function triggers automatically when the differential pressure across the permeable sidewall 52 of the filter media 46 exceeds a value at which the hydraulic induced downstream force on the shuttle overcomes the upstream biased shuttle force, for example, the force of the biasing mechanism 68 and/or of the latch 70. The hydraulic pressure in the axial bore pushes the shuttle 56 downstream and the scraper 66 is pushed along the sidewall 52 of the filter media scraping away accumulated debris 74 particles. This scraping action is triggered every time the hydraulic fluid 76 is pumped and the filter generates a differential pressure that exceeds the filter's set pressure for cleaning. As the permeable sidewall is cleaned the pressure differential across the sidewall will decrease as will the pressure in the axial bore. The shuttle and scraper will be moved upstream as the pressure in the axial bore decreases and the upstream biasing shuttle force overcomes the downstream force.

FIGS. 2 and 3 illustrate a hydraulic circuit 10 with the filter 12 operating in a non-clogged state. The hydraulic fluid 76 is pumped downstream from a source 34 through the filter 12 to a hydraulic device 30. The hydraulic fluid 76 passes through the inlet conduit 42 to the axial bore 50 of the filter media 46 and through the permeable sidewall 52 into the annulus 54 to exit through the outlet 44.

Figure 4:
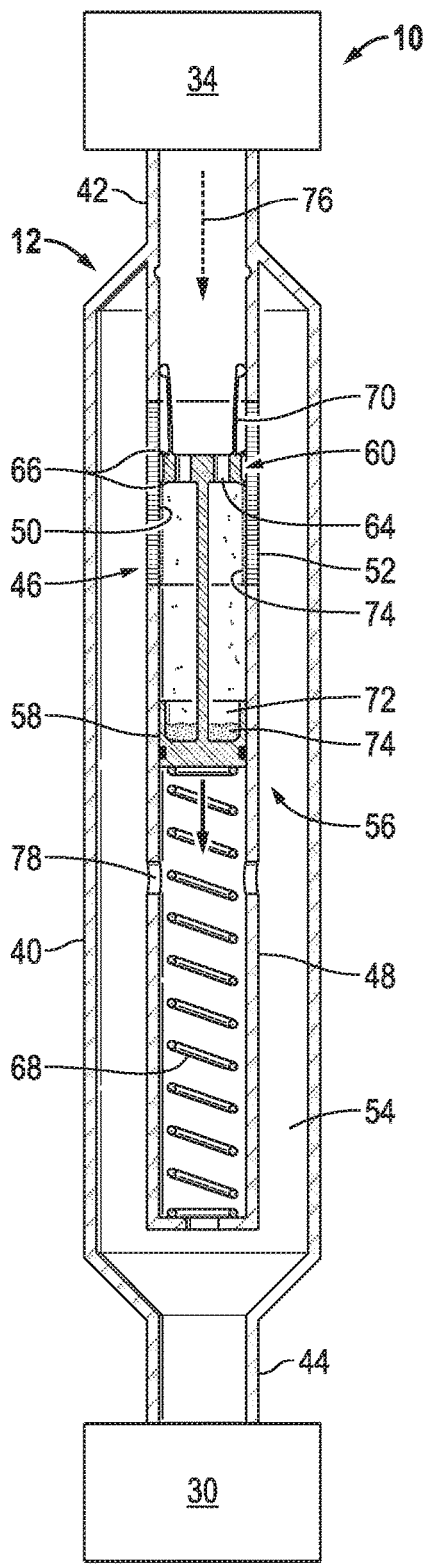
FIG. 4 is a schematic illustration of a hydraulic circuit incorporating a self-cleaning filter during a cleaning cycle according to one or more aspects of the disclosure.

FIG. 4 illustrates the self-cleaning action as the shuttle 56 is moved downstream and the scraper 66 removes debris 74 from the filter media sidewall 52. In this example, the dislodged debris 74 is collected in a receptacle 72. In the depicted examples, the downstream force of the differential pressure acting on the shuttle assembly 56 overcomes both the upstream force of the biasing mechanism 68 and connecting force of the latch 70. Once the sidewalls 52 of the filter media have been cleaned sufficiently, the pressure differential across the filter media 46 will reduce to a level at which the upstream biasing force of bias device 68 will urge the shuttle 56 back to the first position. The scrapers 66 may remove additional debris 74 as the shuttle 56 and the scraper 66 move upstream returning to the first position.

Figure 5:
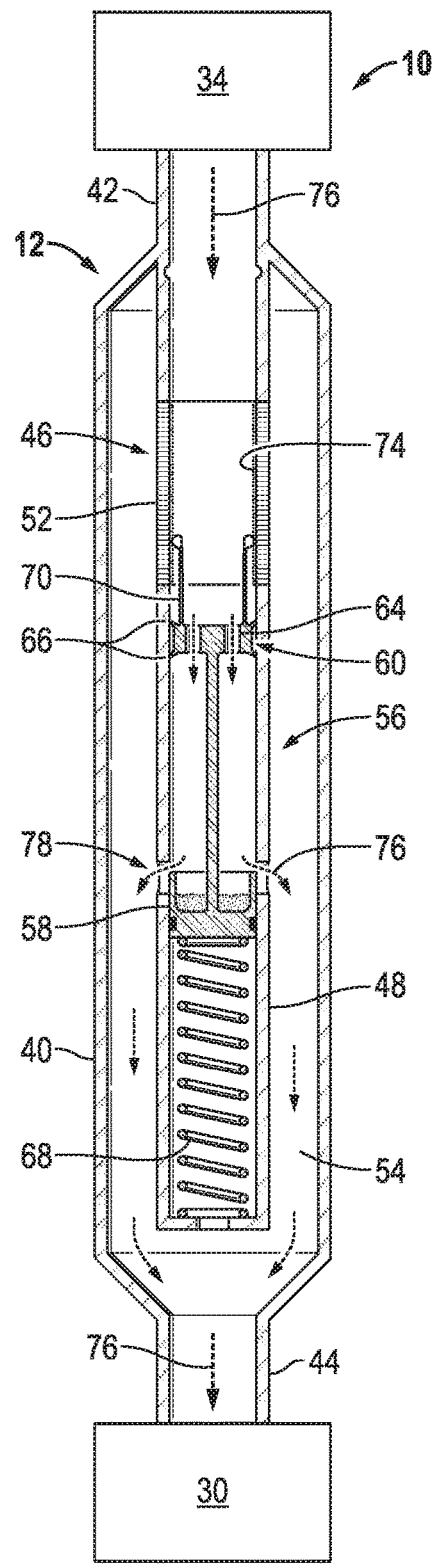
FIG. 5 is a schematic illustration of a hydraulic circuit incorporating a self-cleaning filter in a filter bypass mode according to one or more aspects of the disclosure.

FIG. 5 illustrates a bypass mode or position in the instances in which the filter media has not been adequately cleaned. This bypass mode allows the hydraulic circuit 10 to continue to function when the pressure drop across the clogged filter media 46 may be too great to operate the hydraulic device 30. In other words, some hydraulic circuits may have limited pressure availability and the pressure loss at the filter 12, or complete clogging of the filter media 46, would result in a hydraulic pressure and or fluid flow volume insufficient to operate the hydraulic device 30. In the bypass mode or position, the shuttle piston 58 is moved downstream of a relief port 78 in the internal sleeve 48 allowing the hydraulic fluid 76 to pass to the annulus 54 and the outlet 44.

A method includes filtering hydraulic fluid 76 flowing through a filter 12, the filter 12 including a housing 40 that permits the hydraulic fluid 76 to flow from an inlet conduit 42 to an outlet 44, a filter media 46 having permeable sidewall 52 and an axial bore 50 connected with the inlet conduit 42, a sleeve 48 connected in-line with the axial bore 50 and downstream of the inlet conduit 42, an annulus 54 between the housing 40 and the permeable sidewall 52 in communication with the outlet 44, and a shuttle 56 having a piston 58 moveably disposed in the sleeve 48 and an upstream element 60 carrying a scraper 66 disposed with the axial bore 50, whereby the hydraulic fluid 76 flows from the inlet conduit 42 through the permeable sidewall 52 into the annulus 54; applying a downstream force to the shuttle 56 in response to hydraulic pressure in the axial bore 50 and biasing the shuttle 56 upstream with an upstream shuttle force in response to a biasing device 68. The method includes scraping the permeable sidewall 52 as the shuttle 56 moves downstream in response to the downstream force exceeding the upstream shuttle force. The permeable sidewall 52 may be scraped and cleaned by moving the shuttle upstream in response to the upstream shuttle force exceeding the downstream force.

The method may also include moving the shuttle 56 downstream to a bypass position in response to the downstream force exceeding the upstream shuttle force and bypassing the hydraulic fluid flow through the axial bore 50, the sleeve 48 and through a relief port 78 in the sleeve 48 and into the annulus 54.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A filter for a hydraulic circuit, the filter comprising:
a housing to permit flow of hydraulic fluid from an inlet conduit to an outlet;
a filter media having a permeable sidewall and an axial bore connected with the inlet conduit;
a sleeve connected in-line with the axial bore and downstream of the inlet conduit;
an annulus between the housing and the permeable sidewall in communication with the outlet; and
a shuttle having a piston moveably disposed in the sleeve and an upstream element carrying a scraper to remove debris from the permeable sidewall when the scraper is moved in the axial bore, wherein the shuttle is biased downstream by hydraulic pressure in the axial bore,
wherein the sleeve comprises a relief port that allows the hydraulic fluid to bypass the axial bore of the filter media and pass to the annulus and the outlet when a downstream shuttle force exceeds an upstream shuttle force such that the piston of the shuttle moves downstream of the relief port,
wherein the relief port is located downstream of an end of the piston when the shuttle is in a first position with the scraper located upstream of the permeable sidewall, and
wherein the relief port is located upstream of the end of the piston when the shuttle is in a second position with the scraper located downstream of the permeable sidewall.

2. The filter of claim 1, further comprising a bias device located downstream of the piston to bias the shuttle upstream.

3. The filter of claim 1, further comprising a latch releasably holding the shuttle in the first position with the scraper located upstream of the permeable sidewall.

4. The filter of claim 1, further comprising:
a bias device located downstream of the piston to bias the shuttle upstream; and
a latch releasably holding the shuttle in the first position with the scraper located upstream of the permeable sidewall.

5. The filter of claim 1, wherein the shuttle comprises a receptacle located downstream of the scraper to receive debris removed by the scraper.

6. The filter of claim 1, further comprising:
a bias device located downstream of the piston to bias the shuttle upstream.

7. The filter of claim 6, further comprising a latch releasably holding the shuttle in the first position with the scraper located upstream of the permeable sidewall.

8. The filter of claim 6, wherein the shuttle comprises a receptacle located downstream of the scraper to receive debris removed by the scraper.

9. The filter of claim 1, further comprising:
a bias device located downstream of the piston to bias the shuttle upstream;
a latch releasably holding the shuttle in the first position; and
a receptacle disposed with the shuttle and located downstream of the scraper to receive debris removed by the scraper.

10. A method, comprising:
filtering hydraulic fluid flowing through a filter, the filter comprising a housing permitting the hydraulic fluid to flow from an inlet conduit to an outlet, a filter media having a permeable sidewall and an axial bore connected with the inlet conduit, a sleeve connected in-line with the axial bore and downstream of the inlet conduit, an annulus between the housing and the permeable sidewall in communication with the outlet, and a shuttle having a piston moveably disposed in the sleeve and an upstream element carrying a scraper disposed with the axial bore, whereby the hydraulic fluid flows from the inlet conduit through the permeable sidewall into the annulus;
applying a downstream force to the shuttle in response to hydraulic pressure in the axial bore;
biasing the shuttle upstream with an upstream shuttle force in response to a biasing device; and
allowing the hydraulic fluid to bypass the axial bore of the filter media and pass to the annulus and the outlet through a relief port in the sleeve when the downstream force exceeds the upstream shuttle force such that the piston of the shuttle moves downstream of the relief port,
wherein the relief port is located downstream of an end of the piston when the shuttle is in a first position with the scraper located upstream of the permeable sidewall, and wherein the relief port is located upstream of the end of the piston when the shuttle is in a second position with the scraper located downstream of the permeable sidewall.

11. The method of claim 10, comprising scraping the permeable sidewall as the shuttle moves downstream in response to the downstream force exceeding the upstream shuttle force.

12. The method of claim 10, comprising:
scraping the permeable sidewall as the shuttle moves downstream in response to the downstream force exceeding the upstream shuttle force; and
scraping the permeable sidewall as the shuttle moves upstream in response to the upstream shuttle force exceeding the downstream force.

13. The method of claim 10, comprising:
scraping the permeable sidewall as the shuttle moves downstream in response to the downstream force exceeding the upstream shuttle force; and
scraping the permeable sidewall as the shuttle moves upstream in response to the upstream shuttle force exceeding the downstream force.

14. A well system, the system comprising:
a hydraulic device connected in a hydraulic circuit and disposed in a wellbore, the hydraulic device actuated in response to hydraulic signals; and
a filter connected in the hydraulic circuit, the filter comprising:
a housing permitting the hydraulic fluid to flow from an inlet conduit and to an outlet;
a filter media having a permeable sidewall and an axial bore connected with the inlet conduit;
a sleeve connected in-line with the axial bore and downstream of the inlet conduit;
an annulus between the housing and the permeable sidewall and in communication with the outlet;
a shuttle having a piston moveably disposed in the sleeve and an upstream element carrying a scraper positioned to remove debris from the permeable sidewall when the scraper is moved in the axial bore, wherein the shuttle is biased downstream by hydraulic pressure in the axial bore; and
a bias device located in the sleeve and applying an upstream force on the shuttle,
wherein the sleeve comprises a relief port that allows the hydraulic fluid to bypass the axial bore of the filter media and pass to the annulus and the outlet when a downstream shuttle force exceeds the upstream shuttle force such that the piston of the shuttle moves downstream of the relief port,
wherein the relief port is located downstream of an end of the piston when the shuttle is in a first position with the scraper located upstream of the permeable sidewall, and
wherein the relief port is located upstream of the end of the piston when the shuttle is in a second position with the scraper located downstream of the permeable sidewall.

15. The system of claim 14, further comprising a latch releasably holding the shuttle in the first position with the scraper located upstream of the permeable sidewall.

16. The system of claim 14, wherein the shuttle comprises a receptacle located downstream of the scraper to receive debris removed by the scraper.

17. The system of claim 14, further comprising:
a latch releasably holding the shuttle in the first position; and
a receptacle disposed with the shuttle and located downstream of the scraper to receive debris removed by the scraper.

* * * * *